United States Patent [19]
Skowronski et al.

[11] Patent Number: 6,019,304
[45] Date of Patent: Feb. 1, 2000

[54] RETRACTABLE REEL WITH CHANNELED RATCHET MECHANISM

[75] Inventors: Richard E. Skowronski, North Hampton, N.H.; Paul C. Burke, 470 Heather La., Lake Forest, Ill. 60045

[73] Assignees: Telefonix, Inc., North Chicago; Paul C. Burke, Lake Forest, both of Ill.

[21] Appl. No.: 09/003,309

[22] Filed: Jan. 6, 1998

Related U.S. Application Data

[63] Continuation-in-part of application No. 08/779,794, Jan. 7, 1997.

[51] Int. Cl.[7] .................................................. B65H 75/48
[52] U.S. Cl. ........................ 242/373; 242/378; 242/378.1; 242/385.1
[58] Field of Search ................................ 242/378, 378.1, 242/378.2, 378.3, 385.1, 385.3, 373

[56] References Cited

U.S. PATENT DOCUMENTS

| | | |
|---|---|---|
| 1,247,672 | 11/1917 | Hallberg . |
| 1,276,825 | 8/1918 | Swope . |
| 1,442,999 | 1/1923 | Boyle . |
| 1,446,410 | 2/1923 | Bennett et al. . |
| 1,737,978 | 12/1929 | Sebell . |
| 1,865,069 | 6/1932 | Allen . |
| 1,958,626 | 5/1934 | Krantz . |
| 2,031,434 | 2/1936 | Stern et al. . |
| 2,206,352 | 7/1940 | Hellmann . |
| 2,211,561 | 8/1940 | Flannelly . |
| 2,262,587 | 11/1941 | Kaempf . |
| 2,678,779 | 5/1954 | Bellmer . |
| 2,979,576 | 4/1961 | Huber . |
| 3,061,234 | 10/1962 | Morey . |
| 3,584,157 | 6/1971 | Prescott . |
| 3,657,491 | 4/1972 | Ryder et al. . |
| 4,053,118 | 10/1977 | Aikins . |
| 4,062,608 | 12/1977 | Pierce . |
| 4,081,153 | 3/1978 | Tanaka et al. . |
| 4,384,688 | 5/1983 | Smith . |
| 4,386,744 | 6/1983 | Higbee . |
| 4,472,010 | 9/1984 | Parnello . |
| 4,517,757 | 5/1985 | Asada et al. . |
| 4,646,987 | 3/1987 | Peterson . |
| 4,813,627 | 3/1989 | Nelson . |
| 4,940,859 | 7/1990 | Peterson . |
| 4,989,805 | 2/1991 | Burke . |
| 5,094,396 | 3/1992 | Burke . |
| 5,104,056 | 4/1992 | Jannotta et al. . |
| 5,109,412 | 4/1992 | Hollowed et al. . |
| 5,124,685 | 6/1992 | Rankin . |
| 5,128,993 | 7/1992 | Skowronski . |
| 5,155,766 | 10/1992 | Skowronski . |
| 5,156,242 | 10/1992 | Ditzig . |
| 5,289,987 | 3/1994 | Collins et al. . |
| 5,410,597 | 4/1995 | Kepley, III et al. . |
| 5,520,350 | 5/1996 | Doty et al. . |
| 5,535,960 | 7/1996 | Skowronski et al. . |
| 5,590,749 | 1/1997 | Wagner et al. . |

FOREIGN PATENT DOCUMENTS

| | | |
|---|---|---|
| 171356 | 11/1951 | Germany . |
| 3626266 | 10/1987 | Germany ........................... 242/385.1 |
| 9-9054882 | 2/1997 | Japan . |
| 9707344 | 3/1998 | United Kingdom . |
| 2316672 | 7/1998 | United Kingdom . |

*Primary Examiner*—Donald P. Walsh
*Assistant Examiner*—William A. Rivera
*Attorney, Agent, or Firm*—Juettner, Pyle & Piontek

[57] ABSTRACT

A retractable reel assembly comprises double tear drop shaped housing, a spool disposed in the housing and journaled for rotation about an axis, the spool and housing defining a plurality of chambers within the housing around the axis. The spool and housing define a cable storage chamber with a second length of cable retractably stored therein and a cable expansion chamber with a length of cable stored therein, a spring chamber and a ratchet chamber. The housing also has a spring takeup compartment and cable adjustment compartment located on a second parallel axis. A constant force spring extends from the spring storage chamber to the spring takeup compartment to urge the spool to rotate in a cable retracting direction.

41 Claims, 3 Drawing Sheets

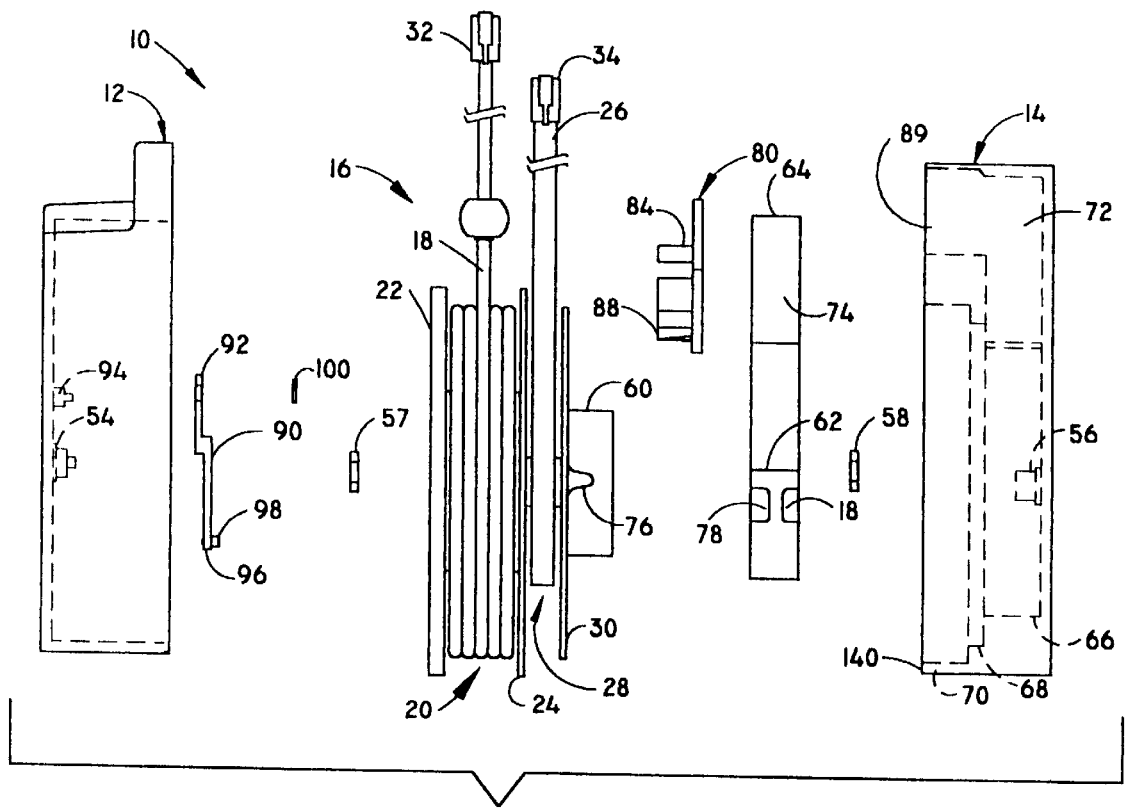
Fig. 1
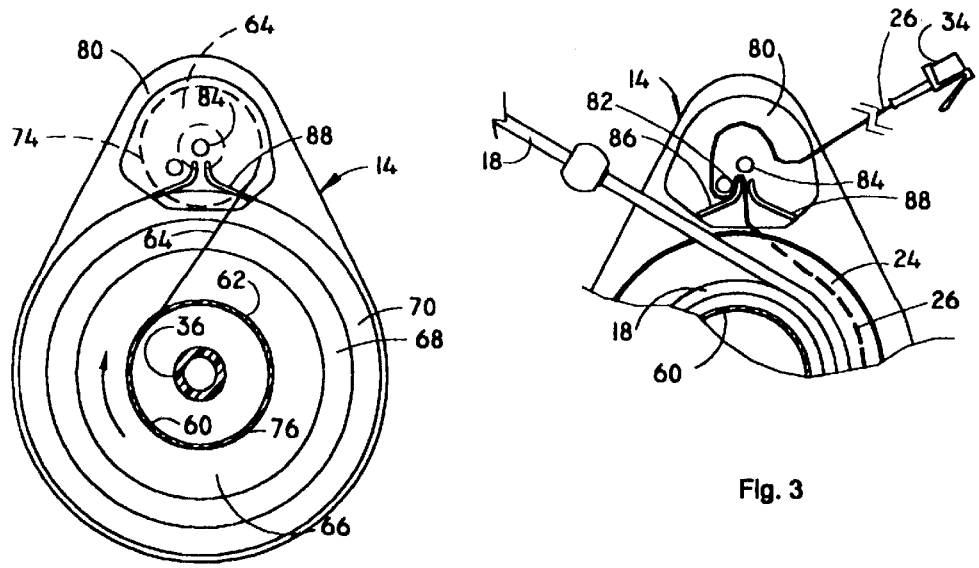
Fig. 2
Fig. 3

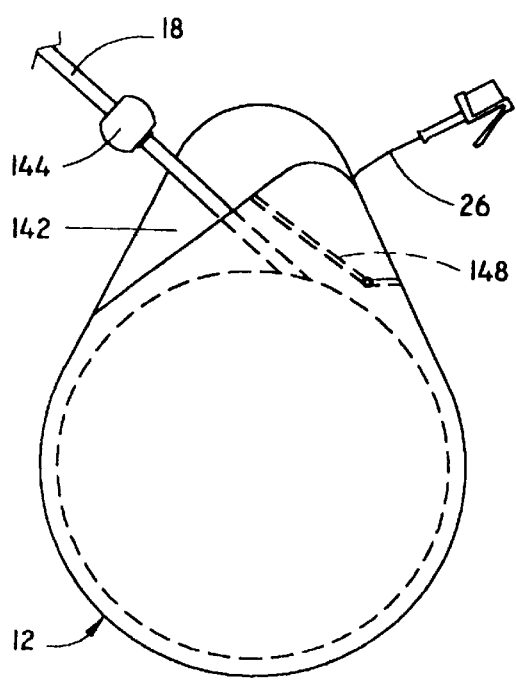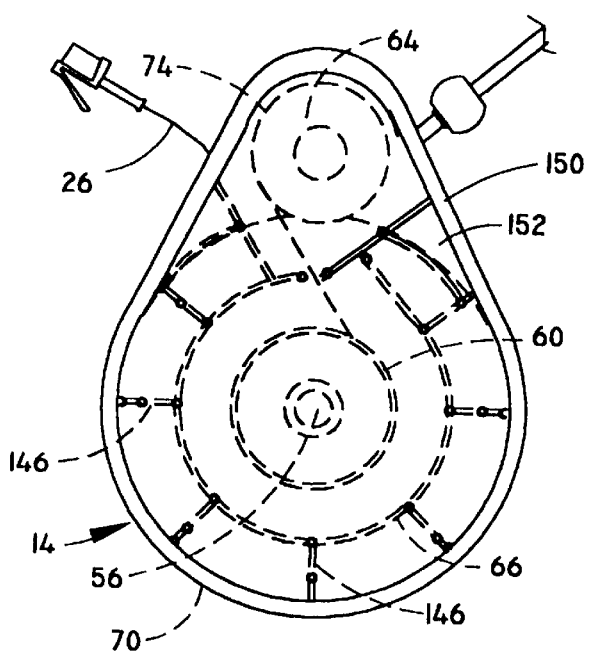
Fig. 7
Fig. 8

RETRACTABLE REEL WITH CHANNELED RATCHET MECHANISM

CROSS-REFERENCE

This is a continuation-in-part application of commonly owned and copending related application Ser. No. 08/779,794, filed Jan. 7, 1997, entitled "Retractable Reel With Channeled Ratchet Mechanism."

BACKGROUND OF THE INVENTION

The present invention is directed to a retractable reel assembly having a channeled ratchet mechanism and a multi-compartmented housing.

Retractable reels have been used in various applications to retractably store various types of cables. For example, a conventional retractable reel assembly for use with a telephone cable has a reel on which a length of a round telephone cable is retractably wound. The telephone cable has an outer insulating jacket and a plurality of internal conductive members, each of which is composed of a wire jacketed by an insulating cover. A helically coiled spring urges the reel to rotate in a direction to cause the round telephone cable to be retracted back into the reel after it is pulled out. The reel has an expansion chamber in which a flat cable is spirally disposed. The flat cable in the expansion chamber is connected to the round cable on the reel via a pair of connectors disposed within the reel.

Examples of such retractable reels may be found in U.S. Pat. Nos:

| | |
|---|---|
| 1,276,825 | 2,979,576 |
| 1,446,410 | 3,061,234 |
| 1,737,978 | 3,584,157 |
| 1,865,069 | 3,657,491 |
| 1,958,626 | 4,053,118 |
| 2,206,352 | 4,062,608 |
| 2,211,561 | 4,384,688 |
| 2,262,587 | 4,472,010 |
| 2,678,779 | 4,646,987 |
| | 5,094,396 |

A retractable reel is usually provided with some type of ratchet mechanism for controlling the retraction of the cable into the reel. For example, U.S. Pat. No. 5,094,396 to Paul Burke discloses a retractable reel assembly for a telephone extension cord having a ratchet comprising a ratchet gear, a pawl lever and a spring. U.S. Pat. No. 4,384,688 to Smith discloses a reel for storing a retractable cord having a ratchet gear that selectively engages a pawl that is biased by a spring about a pivot point.

A disadvantage of such prior retractable reels is that the helically coiled springs used to rotate the reel in the direction causing retraction of the cable are expensive to manufacture and difficult to assemble to the other components of the cord reel, all of which adds cost and complexity to the retractable reel. Also, the helically coiled springs wind during manual extension of the telephone cord and unwind when urging the reel to rotate in the direction retracting the cord. As the cord winds onto the reel, its diameter on the reel increases, resulting in i decreasing retraction force to be exerted on the cord for a given rotational torque exerted by the spring on the reel. Disadvantageously, as the helical spring unwinds the rotational torque it exerts on the reel decreases, resulting in a rapidly decreasing retraction force being exerted on the cord and a potential failure of the cord to be retracted under various conditions. One way to overcome a decreasing rotational torque exerted by a helical spring as it unwinds is to use a constant force spring to urge the reel in the direction of rotation causing retraction of the spring, for example a constant force spring of a type disclosed in U.S. Pat. No. 5,124,685. In that patent, a retractable tether using a constant force spring serves as a security device for merchandise displayed for customer handling and demonstration.

Another disadvantage of prior retractable reels resides in the ratchet mechanism that is provided to selectively prevent retraction of the telephone cord. One such ratchet mechanism is disclosed in U.S. Pat. No. 5,094,396, issued to the present inventor and the teachings of which are incorporated herein by reference. In said patent the ratchet mechanism comprises, as is conventional, a ratchet gear, a pawl lever and a pawl spring for urging the pawl lever into engagement with the ratchet gear. A particular disadvantage of such conventional ratchet mechanism is that the required spring adds cost and complexity to the retractable reel, both because of the cost of the pawl spring itself and because of the increased cost incurred as a result of the additional time and complexity occasioned in assembly of the retractable reel as a result of the spring.

Also known in the art are reels that embody a ratchet mechanism that does not utilize a pawl spring. Instead, the ratchet mechanism comprises a circular ratchet plate having arcuate channels formed in a surface thereof and a pawl that is pivotally supported at one end and has a follower at an opposite end that rides in and is guided by the channels in response to relative rotation between the pawl and ratchet plate. The resulting ratchet mechanism is an improvement over the spring loaded type ratchet mechanisms previously encountered. However, these reels are difficult to assemble, since the ratchet plate is formed in a surface of a stationary housing for the retractable reel while the pawl is carried by and rotated with a spool of the assembly.

SUMMARY OF THE INVENTION

The present invention is directed to a retractable reel assembly having a housing, a spool disposed in the housing and journaled for rotation about an axis, a spring operatively associated with the spool to urge the spool to rotate in a cable retracting direction, and a ratchet mechanism. The spool has a cable storage chamber with a length of cable retractably stored therein and a cable expansion chamber with a length of cable stored therein, and the ratchet mechanism controls retraction of the cable into the cable storage chamber by selectively preventing rotation of the spool relative to the housing. The ratchet mechanism includes a channel having a channel guide formed therein and a ratchet arm which slidingly engages the channel.

The cable disposed in the storage chamber may be wound about a central axis, and the ratchet mechanism may be provided in the form of a plate disposed perpendicular to the central axis, with the channel being formed in the plate. The ratchet arm may be a pivotable arm having a first end fixed to the housing at a pivot point and a second end that slidingly engages the channel.

The ratchet mechanism may include an outer annular channel having a relatively large diameter, an inner annular channel having a relatively small diameter, a transfer-in channel interconnecting the inner and outer annular channels, and a transfer-out channel interconnecting the inner and outer annular channels. The transfer-out channel may be in the form of a V-shaped channel that acts as a stop mechanism for stopping rotation of the spool when the spool is rotated in the cable retracting direction.

The ratchet mechanism may also include means, such as a channel guide, for causing the second end of the pivot arm to be transferred from the outer annular channel to the inner annular channel via the transfer-in channel when the spool is rotating in a direction opposite the cable retracting direction, and means for causing the second end of the pivot arm to be transferred from the inner annular channel to the outer annular channel via the transfer-out channel.

The spool and the housing define a plurality of chambers within the housing around the central axis. A length of cable is wound on the spool in the housing and around the axis both in a first one of the chambers defining a cable storage chamber for a first portion of the length of cable and in a second one of the chambers defining a cable expansion chamber for a second portion of the length of cable. The housing has a first opening generally radially outward of the cable storage chamber through which an end of said first portion of the cable is extended, and a second opening generally radially outward of the cable expansion chamber through which an end of the second portion of the cable is extended. A spring is disposed in part around the axis in a third one of the chambers defining a spring containing chamber and the spring is operatively coupled to the spool means to urge the spool means to rotate in a cable retracting direction that winds the first portion of the cable onto the spool means in the cable storage chamber. The first portion of the cable is manually unwindable, against the urging of the spring, off of the spool means and out of the cable storage chamber through the first housing opening. The housing includes a spring takeup compartment radially outward from and in communication with the third chamber and the spring comprises a length of constant-force spring having one end operatively coupled to the spool in the third chamber and an opposite end received in the spring takeup compartment. The reel assembly preferably includes a ratchet mechanism in a fourth one of the chambers that define a ratchet mechanism chamber, and controls retraction of the first portion of the cable into the first chamber by selectively preventing rotation of the spool means by the spring in the cable retracting direction.

In the described embodiment, the length of constant force spring unwinds and winds in the spring takeup compartment about a spring takeup axis that is radially outward from and parallel to the central spool axis. The four chambers on the spool axis are axially spaced along the axis. In the illustrated embodiment there is no axial overlap of the four chambers. The housing has a spindle on opposite sides thereof along the axis and the spool is journaled for rotation on the spindle. The spool has first, second and third axially spaced radial walls defining the cable storage chamber between the first and second radial walls and the cable expansion chamber between the second and third radial walls. The housing has first and second side walls at opposite axial ends of the spool and the spring containing chamber is defined between the first side wall and one of the first and third radial walls and the ratchet mechanism chamber is defined between the second side wall and the other of the first and third radial walls.

Advantageously, the ratchet mechanism is a springless ratchet mechanism, and comprises a ratchet plate defined on a surface of the radial wall that faces the housing second side wall and a ratchet arm pivotally coupled at one end to the housing second side wall and operatively coupled at an opposite end to the ratchet plate.

The housing includes cable adjustment chamber means for storing a variable length of the second part of the cable toward the end thereof so that the length of the second part of the cable that extends outside of the housing through the housing second passageway is adjustable. The cable adjustment chamber is located radially outward of the cable expansion chamber and the housing second passageway communicates with the cable adjustment chamber.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is an exploded perspective view of a preferred embodiment of a retractable reel in accordance with the invention;

FIG. 2 is a side view, shown partly in cross section, of a portion of the retractable reel of FIG. 1;

FIG. 3 is a side view, shown partly in cross section, of a portion of the retractable reel of FIG. 1;

FIG. 7 is a side view of a left housing portion of the retractable reel; and

FIG. 8 is a side view of a right housing portion of the retractable reel.

DETAILED DESCRIPTION OF A PREFERRED EMBODIMENT

Figure 4:
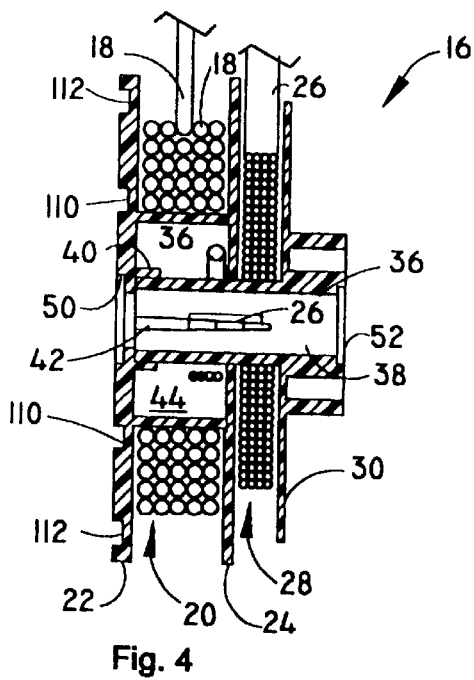
FIG. 4 is a cross sectional side view of a portion of the retractable reel of FIG. 1.

FIG. 1 is an exploded view of a preferred embodiment of a retractable reel 10 in accordance with the invention. Referring to FIG. 1, the reel 10 includes a left housing portion 12, a right housing portion 14, and a plastic spool assembly 16 disposed between the housing portions 12, 14. As will be described in greater detail, the left and right housing portions and spool assembly together structurally define a multi-compartmented housing assembly for receiving and containing the various components of the retractable reel 10. The spool assembly 16 has a first length of electrical cable 18 disposed in a cable storage chamber 20 located between a circular ratchet plate 22 and a circular plate 24, and a second length of electrical cable 26 disposed in a cable expansion chamber 28 located between the circular plate 24 and a circular end plate 30.

The end of the cable 18, which is conventional 4-wire telephone cable, is connected to a standard RJ-11 connector 32, and the end of the cable 26, which also includes four separately insulated wires, is connected to an RJ-11 connector 34. Other types of connectors and other types of cables with different numbers of wires could be used. As shown in FIG. 4, the cable 18 preferably has a circular cross-sectional area, and the cable 26 preferably has a generally flat cross-sectional area due to its four internal wires being disposed side-by-side in a horizontal line. The four internal wires of the two cables 18, 26 are conductively interconnected in a conventional manner, such as by splicing, at a point (not shown) in the interior of the spool assembly 16, so that there is a continuous electrical path between the two RJ-11 connectors 32, 34. Alternatively, a continuous cable with no splice could be used in place of the two cables 18, 26.

Referring to FIG. 4, the spool assembly 16 has a central hub 36 through which a central bore 38 passes. The left end of the hub 36 is fixably disposed within an annular mating cylinder 40 integrally formed on the right side of the ratchet plate 22. A portion of the flat cable 26 passes from the expansion chamber 28 into the central bore 38 in the hub 36 via a slot 42 formed in the hub 36, and from the central bore 38 into a splicing chamber 44 formed about the hub 36. The cables 18, 26 are spliced together at a point (not shown) in the generally annular splicing chamber 44.

A counterbore 50 is formed in the ratchet plate 22 disposed on the left-hand portion of the spool assembly 16, and a counterbore 52 is formed in the hub 36 at the right-hand portion of the spool assembly 16. The spool assembly 16 is rotatably supported via an axle 54 (FIG. 1) integrally formed in the interior of the left housing portion 12 and a like axle 56 (FIG. 1) integrally formed in the interior of the right housing portion 14. The smaller-diameter end portion of each of the axles 54, 56 is disposed in the central hole of a respective one of a pair of bearing washers 57, 58, and each of the bearing washers 57, 58 is disposed in a respective one of the counterbores 50, 52.

Referring to FIG. 1, the spool assembly 16 has a cylindrical spring support 60 to which an end 62 of a coiled constant torque spring 64 is connected (see also FIG. 2). As shown in FIG. 4, the spring support 60 may be integrally formed with the hub 36 and the plate 30. As shown in FIGS. 1 and 2, the right housing portion 14 has a first annular chamber 66 formed therein and sized to accommodate the spring support 60, a second annular chamber 68 sized to accommodate the circular plate 30 of the spool assembly 16, and a third annular chamber 70 sized to accommodate the circular plate 24. The right housing portion 14 also has a spring chamber 72 formed therein at a point radially outward from the annular chamber 66.

Referring to FIGS. 1 and 2, the spring 64 has a first portion 74 that is tightly coiled, and when the reel 10 is assembled the end 62 of a second portion of the spring 64 is fixed within a slot 76 formed in the spring support 60. To facilitate placing the end 62 of the spring 64 within the slot 76 the sides of the spring 64 are provided with a pair of cut-out portions 78, so that the end 62 of the spring is generally T-shaped. When the spring end 62 is disposed within the slot 7,6, the horizontal upper part of the T-shaped end 62 keeps it within the slot 76.

When the coiled portion 74 of the spring 64 is disposed within the spring chamber 72, the chamber is closed by a spring cover 80. As shown in FIGS. 1–3, the side of the spring cover 80 has a pair of support rods 82, 84 and a pair of arcuate support members 86, 88 integrally formed therewith. As shown in FIG. 3, the portion of the cable 26 adjacent the connector 34 is wedged between the support rods 82, 84 and the support members 86, 88, so as to provide a length of the cable 26 outside the retractable reel 10.

The portion of the end of the second length of cable 26 between the point at which the cable is fixed between the support rod 82 and the support member 86 and the point at which the cable passes outside the housing portion 14 (via an exit hole not shown) is disposed within the cable adjustment chamber 89 (FIG. 1) which allows the length of the cable 26 outside of the housing 14 to be adjusted by selectively pushing a variable portion of the cable 26 into the cable adjustment chamber 89 via the exit hole.

Figure 5:
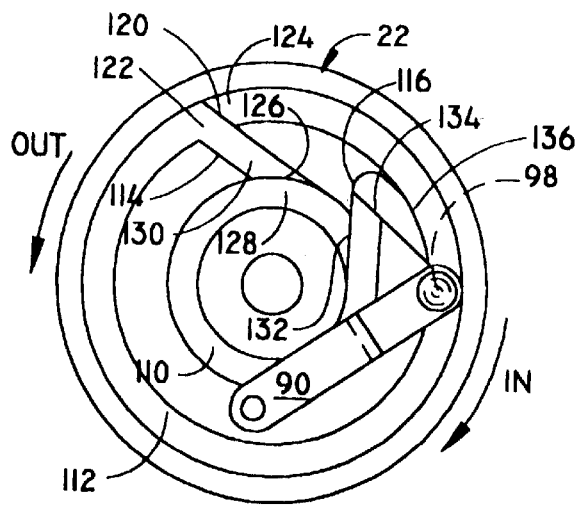
FIG. 5 is a side view of a ratchet arm and a ratchet plate of the retractable reel of FIG. 1.

Referring to FIGS. 1 and 5, the reel 10 has a ratchet arm 90 having a first end 92 pivotally fixed to a pivot rod 94 integrally formed on the interior of the housing portion 12 and a second end 96 which has a guide pin 98. The larger-diameter portion of the pivot rod 94 is disposed within a hole 93 in the end 92 of the ratchet arm 90, and a washer 100 (FIG. 1) is secured to the smaller-diameter portion of the pivot rod 94 by ultrasonically welding or melting the plastic smaller-diameter portion of the pivot rod so that it is permanently attached to the washer 100.

Referring to FIGS. 1 and 2, since the coiled portion 74 of the spring 64 is fixed within the spring chamber 72 and the other end 62 of the spring 64 is fixed to the spring support 60 fixed to the spool assembly 16, the spring urges the spring support 60 and the spool assembly 16 in a clockwise direction as shown by the arrow in FIG. 2. When the retractable reel 10 is used, the cable 18 may be pulled out of the reel 10, in which case the spool assembly 16 rotates, against the force of the spring 64, in a counterclockwise direction (relative to FIG. 2). As described below, the ratchet arm 90 and ratchet plate 22 control retraction of the cable 18 back into the reel 10.

FIG. 5 shows the ratchet arm 90 and the left-hand side (as shown in FIG. 1) of the ratchet plate 22. The ratchet plate 22 has an inner annular (e.g., circular) channel 110 of a relatively small diameter and an outer annular channel 112 of a relatively large diameter formed therein (see also FIG. 4). A relatively straight transfer-in channel 114 and V-shaped transfer-out channel 116 are formed in the ratchet plate 22 and interconnect the inner and outer channels 110, 112.

The ratchet arm 90 is flexed towards the ratchet plate 22, so that the guide pin 98 is disposed in one of the channels 110–116 at all times. The "out" arrow indicates the direction (counterclockwise) in which the ratchet plate 22 rotates when the cable 18 is pulled out of the reel 10, and the "in" arrow indicates the direction (clockwise) in which the ratchet plate 22 rotates when the spring 64 causes the cable 18 to be pulled back into the reel 10.

The ratchet plate 22 has a plurality of channel guides formed therein which affect the path of the guide pin 98 of the ratchet arm 90 as it slides along the channels 110–116 upon rotation of the ratchet plate 22. A first channel guide, in the form of a raised ledge 120, is formed at the intersection of a relatively deep channel portion 122 and a relatively shallow channel portion 124. When the ratchet plate 22 rotates in the "out" direction, the raised ledge 120 forces the guide pin 98 of the ratchet arm 90 to pass from the outer channel 112 to the transfer-in channel 114.

A similar channel guide 126 is formed at the intersection of a relatively deep channel portion 128 and a relatively shallow channel portion 130. The channel guide 126 allows the guide pin 98 to pass from the transfer-in channel 114 to the inner channel 110 when the ratchet plate 22 is rotated in the "out" direction, but the channel guide 126 prevents the guide pin 98 from passing from the inner channel 110 to the transfer-in channel 114 when the ratchet plate 122 is rotated in the "in" direction.

A channel guide 132 forces the guide pin 98 from the inner channel 110 to the transfer-out channel 116 when the ratchet plate 22 is rotated in the "in" direction, and a channel guide 134 forces the guide pin 98 to be transferred from the transfer-out channel 116 to the outer channel 112 when the ratchet plate 22 is rotated in the "out" direction. A channel guide 136 prevents the guide pin 98 from entering the transfer-out channel 116 from the outer channel 112 when the ratchet plate 22 rotates in the "in" direction.

Figure 6A:
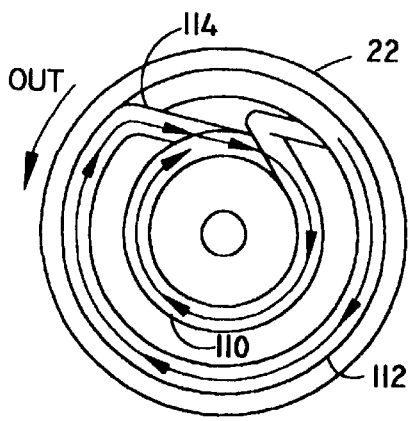
FIGS. 6A–6D illustrate paths taken by a ratchet guide pin of the retractable reel in a plurality of guide channels.

FIGS. 6A–6D illustrate the paths in the channels 110–116 taken by the guide pin 98 during use of the retractable reel 10. Referring to FIG. 6A, as the cord 18 is pulled out of the reel 10, the ratchet plate 22 rotates in the "out" direction, causing the guide pin 98 to slide along the path indicated by the arrows within the channels 110–114.

Figure 6B:
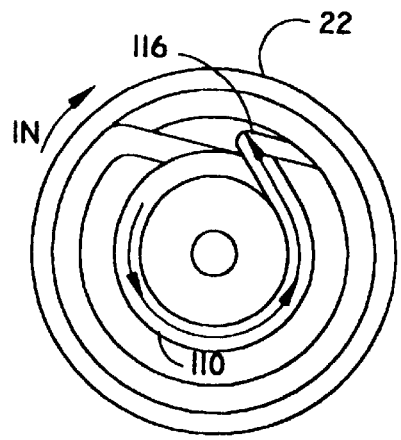

Referring to FIG. 6B, if the cable 18 is released by the user, the spring 64 will cause the ratchet plate 22 to rotate in the "in" direction, causing the guide pin 98 to slide along the path indicated by the arrows within the channels 110, 116. When the guide pin 98 reaches the middle of the V-shaped portion of the transfer-out channel 116, further rotation of the ratchet plate 22 and thus of the spool assembly 16 is prevented. Consequently, the spring 64 is prevented from pulling the cable 18 back into the reel 10 any further, and the V-shaped transfer out channel 116 acts as a stop mechanism to stop further retraction of the cable 18.

Figure 6C:
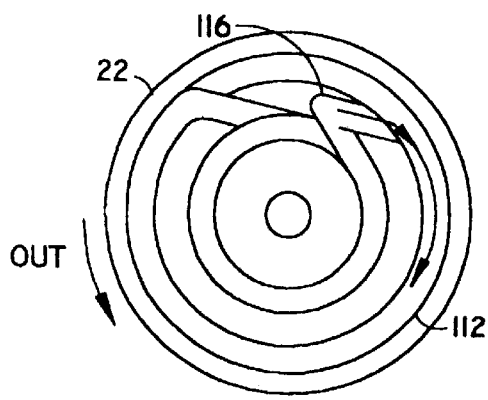
Figure 6D:
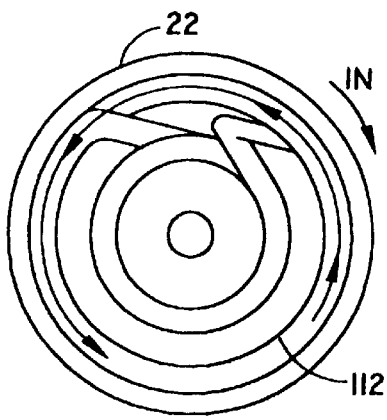

When the user wishes to cause the cable 18 to be fully retracted into the reel 10, the user pulls a short but sufficient length of the cable 18 out of the reel 10 so that the ratchet guide pin 98 slides from the transfer-out channel 116 to the outer channel 112, as shown in FIG. 6C, and then the user releases the cable 18, causing the spring 64 to retract the cable 18 and the ratchet guide pin 98 to follow the path indicated by the arrows in FIG. 6D.

As described above, the guide pin 98 rides in the inner channel 110 when the cable 18 is being extended and in the outer channel 112 when the cable 18 is being retracted. The ratchet mechanism could be modified so that the guide pin 98 rides in the outer channel 112 when the cable 18 is being extended and in the inner channel 110 when the cable 18 is being retracted. Although only a single V-shaped transfer-out channel 116 is shown, more than one such channel could be utilized, depending upon the diameter of the cord reel 10.

In the assembled condition of the retractable reel 10, facing sides 138 and 140 of the respective left and right housing portions 12 and 14 abut, and the particular configuration of the housing portions provides specific advantages. As mentioned, the cable adjustment chamber 89 in the right housing portion 14 allows the length of the cable 26 extending to the exterior of the housing 14 to be adjusted to a desired length by pushing or pulling a selected variable portion of the cable into or out of the cable adjustment chamber 89 via the exit hole from the chamber.

Also, the two axial housing portions 12 and 14 are each teardrop-shaped and when assembled together are rotationally offset to define a recessed area 142 of the housing portion 12 to the exterior of the reel 10 in the area where the cable 18 exits the left housing portion 12, as shown in FIG. 7. A stop 144 is around and adjustable along the cable 18 to prevent the cable from being fully retracted into the reel and to control the length of the cable 18 that remains outside of the reel when the cable is fully retracted. The recessed area 142 provides an area for receipt of the stop 144 when the cable 18 is fully retracted, with the stop 144 then being recessed relative to the right housing portion 14 and generally inaccessible to accidental bumping and generally out of view for a pleasing aesthetic appearance of the reel 10.

To prevent bunching and tangling of the cable 18 during retraction, as seen in FIG. 7 a wall 148 within the left housing portion 12 extends generally parallel to the direction of extension of the cable 18 thereat. The wall 148 is positioned to limit lateral movement of the cable 18 during retraction.

To stiffen and strengthen the reel 10, as seen in FIG. 8 the right housing portion 14 includes a plurality of generally radial ribs 146 extending between curved walls defining the first annular chamber 66 and annular chamber 70.

One side of the housing is advantageously provided with wall 150 which extends a short distance (e.g., 2.5 mm) beyond the end face 152 thereby defining a slight end face recess for receiving an adhesive pad, Velcro hook and loop tape, or other fastener (not shown). The fastener is used to attach the retractable reel of the invention to a telephone base unit or other surface.

As assembled, the left and right housing portions 12, 14 and the spool assembly 16 define a multi-compartment housing assembly. The spool assembly 16 and the right housing portion 14 define side-by-side chambers comprising the spring containing chamber within the annular wall 66, the cable expansion chamber 28 and at least a portion of the cable storage chamber 20, together with the spring chamber 72 that is radially outward from the chamber within the annular wall 66 and the cable adjustment chamber 89 that is radially outward from the cable expansion chamber 28. The spool assembly 16 and the left housing portion 12 then define, in side-by-side relationship, the remainder of the cable storage chamber 20 and the ratchet mechanism chamber. The arrangement advantageously provides a compact, efficient and easily assembled retractable reel assembly that may be manufactured at reduced cost.

Further modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A retractable reel assembly, comprising:

a housing;

a spool in said housing and mounted for rotation about an axis, said spool and said housing defining a plurality of chambers within said housing around said axis;

a length of electrical cable wound on said spool in said housing and around said axis in a first one of said chambers defining a cable storage chamber for a first portion of said length of cable and in a second one of said chambers defining a cable expansion chamber for a second portion of said length of cable, said housing having a first opening generally radially outward of said cable storage chamber for extension therethrough of an end of said first portion of said cable and a second opening from said cable expansion chamber for extension therethrough of an end of said second portion of said cable;

a constant force spring disposed in part around said axis in a third one of said chambers defining a spring containing chamber, said constant force spring being the only spring in said reel assembly;

said housing having a spring takeup compartment radially outward from and in communication with said third chamber, said spring having one end operatively coupled to said spool in said third chamber and an opposite end in said spring takeup compartment, said spring urging said spool to rotate in a cable retracting direction that winds said first portion of said cable onto said spool in said cable storage chamber, said first portion of said cable being manually unwindable, against the urging of said spring, off of said spool and out of said cable storage chamber through said first housing opening.

2. A retractable reel assembly as in claim 1, wherein said spring unwinds and winds in said spring takeup compartment as it simultaneously and respectively winds and unwinds in said spring containing chamber.

3. A retractable reel assembly as in claim 1, wherein said spring unwinds and winds in said spring takeup compartment about a spring takeup axis that is radially outward from and parallel to said spool axis.

4. A retractable reel assembly as in claim 1, wherein said three chambers are axially spaced along said axis in side by side relationship.

5. A retractable reel assembly as in claim 1, wherein said housing has axles on opposite sides thereof along said axis and said spool is journaled for rotation on said axles.

6. A retractable reel assembly as in claim 1, further comprising a ratchet mechanism in a fourth one of said chambers defining a ratchet mechanism chamber, for controlling retraction of said first portion of said cable into said first chamber by selectively preventing rotation of said spool by said spring in said cable retracting direction.

7. A retractable reel assembly as in claim 6, wherein said spool has first, second and third axially spaced radial walls defining said cable storage chamber between said first and second radial walls and said cable expansion chamber between said second and third radial walls, and said housing has first and second side walls at opposite axial ends of said spool defining said spring containing chamber between said first side wall and one of said first and third radial walls and defining said ratchet mechanism chamber between said second side wall and the other of said first and third radial walls.

8. A retractable reel assembly as in claim 7, wherein said ratchet mechanism is a springless ratchet mechanism.

9. A retractable reel assembly as in claim 8, wherein said ratchet mechanism comprises a ratchet plate defined on a surface of said other of said first and third radial walls that faces said housing second side wall and a ratchet arm pivotally coupled at one end to said housing second side wall and operatively coupled at an opposite end to said ratchet plate.

10. A retractable reel assembly as in claim 9, wherein said ratchet plate includes a channel having channel guides formed therein and said opposite end of said ratchet arm slidingly engages said channel.

11. A retractable reel assembly as in claim 6, wherein said ratchet mechanism includes a channel carried by said spool and having a channel guide formed therein, and a ratchet arm pivotally coupled at one end to said housing and slidingly engaged at an opposite end within said channel.

12. A retractable reel assembly as in claim 1, wherein said housing includes a cable adjustment compartment, said second portion of said cable extending from said cable expansion chamber into said cable adjustment compartment and extending from said cable adjustment compartment outside of said housing through said housing second opening, said cable expansion chamber holding a predetermined fixed length of cable and said cable adjustment compartment storing a variable length of said second portion of said cable.

13. A retractable reel assembly as in claim 12, wherein said cable adjustment chamber is radially outward of said cable expansion chamber.

14. A retractable reel assembly as in claim 1, wherein said housing includes a recessed area radially outward from said cable storage chamber, said first opening extending between said recessed area and said cable storage chamber.

15. A retractable reel assembly as in claim 14, further comprising a stop member attached to said first portion of said cable exterior of said housing to prevent complete retraction of said first portion of said cable through said first opening into said cable storage area, and said recessed area of said housing receiving said stop member therein to stop further retraction of said first portion of said cable.

16. A retractable reel assembly as in claim 1, wherein said housing comprises two axial portions, a first portion being tear drop shaped and having said spring containing chamber and said spring takeup compartment and a second portion defining at least part of said cable storage chamber, said housing second portion having a shoulder adjacent to and recessed relative to said housing first portion and being radially outward from said cable storage chamber and said first opening extending through said shoulder into said cable storage chamber.

17. A retractable reel assembly as in claim 16, further comprising a stop member attached to said first portion of said cable exterior of said housing to prevent complete retraction of said first portion of said cable through said first opening into said cable storage area, and said recessed surface of said housing first portion receiving said stop member thereon and said stop member being recessed relative to said tear drop shaped first housing portion.

18. A retractable reel assembly as in claim 1, wherein said housing includes a cable adjustment compartment radially outward of said cable expansion chamber, said second portion of said cable extending through said cable adjustment compartment for storing a variable length of said second portion of said cable; and said housing having a first tear drop shaped portion defining said spring containing chamber, said spring takeup compartment, said cable expansion chamber and said cable adjustment chamber, said spring containing chamber being side by side with said cable expansion chamber and said cable adjustment compartment being side by side with said spring takeup compartment.

19. A retractable reel assembly as in claim 18, further comprising a ratchet mechanism in a fourth one of said chambers defining a ratchet mechanism chamber, and wherein said housing has a second tear drop shaped portion axially abutting said first tear drop shaped portion, said second tear drop shaped portion defining said ratchet mechanism chamber and at least a portion of said cable storage chamber, said ratchet mechanism chamber and said cable storage chamber being side by side.

20. A retractable reel assembly as in claim 19, wherein said second tear drop shaped housing portion is offset relative to said first tear drop shaped housing portion thereby defining a recessed area, said recessed area being radially outward from said cable storage chamber and said first opening extending through said recessed area, and further comprising a stop member attached to said first portion of said cable exterior of said housing to prevent complete retraction of said first portion of said cable through said first opening into said cable storage area, and said recessed area of said housing receiving said stop member and said stop member being recessed relative to said first tear drop shaped housing portion.

21. A retractable cord reel, comprising:
a spool,
a housing enclosing and rotatably supporting said spool about a spool axis, said housing and said spool defining a cable storage chamber, a cable expansion chamber and spring containing chamber coincident with said spool axis, said housing having a first opening generally radially outward from said cable storage chamber, said housing having a spring takeup compartment radially outward from and in substantially the same transverse plane as said spring containing chamber, said spring takeup compartment having a spring takeup axis parallel to said spool axis, said spring containing chamber being in communication with said spring takeup compartment;

said housing having a first axial portion and a second axial portion, said first axial portion being teardrop shaped in its transverse plane and housing said spring containing chamber and said spring takeup compartment, and said second axial portion housing at least a portion of said cable storage chamber, the exterior of said housing having a shoulder on said second housing portion adjacent to and recessed relative to said first housing portion, said shoulder having said first opening therein;

a first length of signal carrying cable wound on said spool around said axis in said cable storage chamber and having an end extending out of said housing through said first opening;

a second length of cable wound on said spool around said axis in said cable expansion chamber, said second length of cable being operatively connected to said first length of cable, and a length of spring having one end within said spring containing chamber attached to said spool and an opposite end within said spring takeup compartment, said spring urging said spool to rotate in a cable retracting direction.

22. A retractable cord reel as in claim 21, wherein said housing and said spool further define a ratchet chamber coincident with said spool axis; and further comprising a ratchet mechanism in said ratchet chamber for selectively restraining rotation of said reel.

23. A retractable cord reel as in claim 21, wherein said first length of cable is round and at least a portion of said second cable is flat.

24. A retractable cord reel as in claim 21, further including a cable adjustment compartment in said housing lying in substantially the same transverse plane as and radially outward from said cable expansion chamber, said cable adjustment compartment having a second opening outward from said housing, said second length of cable extending from said cable expansion chamber through said adjustment compartment, through said second opening and beyond said opening, said housing having a cable restrainer preventing withdrawal of said second length cable beyond said opening by more than a preselected length, and said cable adjustment compartment being adapted to receive and contain a variable portion of said preselected length.

25. A retractable cord reel as in claim 24, wherein said cable adjustment compartment is generally coincident with said spring takeup axis.

26. A retractable cord reel as in claim 21, wherein said housing has an external recessed area lying at least in part in substantially the same plane as and radially outward from said cable storage chamber and said first opening extending between said recessed area and said cable storage chamber, and wherein an end of said first length of cable extends from said cable storage chamber through said first opening to the exterior of said housing.

27. A retractable cord reel as in claim 26, further comprising a stop member attached to said first length of cable toward said end thereof and adapted to be received within said housing recessed area and to engage said housing at said opening to prevent retraction of said cord end through said opening and into said cable storage chamber.

28. A retractable cord reel as in claim 21, including a wall in said cable storage chamber extending generally parallel to and spaced from said first length of cable in said cable storage chamber adjacent said opening, said first length of cable being extendible from and retractable into said cable storage chamber and said wall limiting lateral movement of said first length of cable during extension and retraction.

29. A retractable cord reel as in claim 21, wherein said housing has an internal generally cylindrical wall and said spring containing chamber is within said cylindrical wall.

30. A retractable cord reel as in claim 29, including a plurality of arcuately spaced, generally radial ribs extending between said cylindrical wall and an outer wall of said housing to stiffen said housing.

31. A retractable reel assembly, comprising:

a housing;

a spool disposed in said housing and mounted for rotation about an axis, said spool and said housing defining a cable storage chamber and a cable expansion chamber, said cable storage chamber having a first length of cable retractably stored therein and said cable expansion chamber having a second length of cable stored therein;

a cable adjustment compartment in said housing radially outward from and in communication with said cable expansion chamber and having an opening from said cable adjustment compartment, an end of said second length of cable extending through said adjustment compartment and said opening and beyond said opening by a preselected length, and said cable adjustment compartment is adapted to receive and contain a portion of said preselected length of cable to control the length of cable that extends beyond said opening from said cable adjustment compartment; and a spring operatively associated with said spool, said spring urging said spool to rotate in a cable retracting direction.

32. A reel assembly as defined in claim 31 further comprising a ratchet mechanism for controlling retraction of said first length of cable into said cable storage chamber by selectively preventing rotation of said spool relative to said housing, said ratchet mechanism comprising a channel carried by said spool having a channel guide formed therein and a ratchet arm which slidingly engages said channel, said ratchet arm comprising a pivotable arm having a first end fixed to said housing at a pivot point and a second end that slidingly engages said channel.

33. A reel assembly as defined in claim 32, wherein said ratchet mechanism comprises:

an outer annular channel having a relatively large diameter;

an inner annular channel having a relatively small diameter;

a transfer-in channel interconnecting said inner and outer annular channels; and a transfer-out channel interconnecting said inner and outer annular channels.

34. A reel assembly as defined in claim 33, wherein said transfer-out channel comprises a V-shaped channel.

35. A retractable reel assembly, comprising:

a housing having a first opening;

a spool disposed in said housing and mounted for rotation about an axis, said spool and said housing defining a cable storage chamber having a first length of cable retractably stored therein, a cable expansion chamber having a second length of cable stored therein, and a spring containing chamber;

a spring in part disposed in said spring containing chamber;

said housing having a spring takeup compartment radially outward from and in communication with said spring containing chamber, said spring having one end operatively coupled to said spool in said spring containing chamber and an opposite end in said spring takeup compartment, said spring urging said spool to rotate in a cable retracting direction that winds said first length of cable onto said spool in said cable storage chamber, said first length of cable being manually unwindable, against the urging of said spring, off of said spool and out of said cable storage chamber through said first housing opening;

a recessed area on said housing radially outward from said cable storage chamber; and a stop member attached to said first length of cable outside of said housing to prevent complete retraction of said first length of said cable through said first opening into said cable storage chamber, and said recessed area of said housing receiving said stop member therein.

36. A retractable reel assembly as in claim 35, wherein said housing comprises two axial portions, a first portion being tear drop shaped and having said spring containing chamber and said spring takeup compartment and a second portion defining at least part of said cable storage chamber, said recessed area being adjacent the tear drop shape of said first housing portion.

37. A retractable reel assembly as in claim 35 wherein said first length of cable is round and wherein at least a portion of said second length of cable is flat.

38. A retractable reel assembly as in claim 35, wherein said housing includes a cable adjustment compartment radially outward of said cable expansion chamber said second length of cable extending through said cable adjustment compartment for storing a variable length of said second length of cable; and said housing having a first tear drop shaped portion defining said spring containing chamber, said spring takeup compartment, said cable expansion chamber and said cable adjustment compartment, said spring containing chamber being side by side with said cable expansion chamber and said cable adjustment compartment being side by side with said spring takeup compartment.

39. A retractable reel assembly as in claim 38, further comprising a ratchet chamber in said housing adjacent said spool, and a ratchet mechanism in said ratchet chamber, and wherein said housing has a second tear drop shaped portion axially abutting said first tear drop shaped portion, said second tear drop shaped portion defining said ratchet chamber and at least a portion of said cable storage chamber, said ratchet chamber and said cable storage chamber being side by side.

40. A retractable reel assembly as in claim 39, wherein said second tear drop shaped housing portion is offset relative to said first tear drop shaped housing portion defining said recessed area.

41. A retractable reel assembly as in claim 35, wherein said housing has an end wall, said end wall including a recess for receiving a fastener for attaching said reel assembly to a surface.

* * * * *

UNITED STATES PATENT AND TRADEMARK OFFICE
CERTIFICATE OF CORRECTION

PATENT NO. : 6,019,304
DATED : February 1, 2000
INVENTOR(S) : Skowronski et al.

It is certified that error appears in the above-indentified patent and that said Letters Patent is hereby corrected as shown below:

<u>On the Face of the Patent</u>

Under "[54]" of the title, please delete

"RETRACTABLE REEL WITH CHANNELED RATCHET MECHANISM" AND INSERT

--RETRACTABLE CORD REEL-- therefor

Signed and Sealed this

Third Day of April, 2001

*Attest:*

NICHOLAS P. GODICI

*Attesting Officer*  *Acting Director of the United States Patent and Trademark Office*